(12) United States Patent
Kraeling et al.

(10) Patent No.: US 11,284,233 B2
(45) Date of Patent: Mar. 22, 2022

(54) VEHICLE COMMUNICATION SYSTEM

(71) Applicant: GE Global Sourcing LLC, Norwalk, CT (US)

(72) Inventors: Mark Bradshaw Kraeling, West Melbourne, FL (US); Tyler Listoe, Oakbank (CA); Guillaume Mantelet, Oakbank (CA); Earle Edie, Oakbank (CA); Andrew McKay, Oakbank (CA)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 119 days.

(21) Appl. No.: 16/516,732

(22) PCT Filed: Feb. 20, 2018

(86) PCT No.: PCT/US2018/018689
§ 371 (c)(1),
(2) Date: Jul. 19, 2019

(87) PCT Pub. No.: WO2018/152491
PCT Pub. Date: Aug. 23, 2018

(65) Prior Publication Data
US 2020/0021959 A1     Jan. 16, 2020

Related U.S. Application Data

(60) Provisional application No. 62/460,862, filed on Feb. 19, 2017.

(51) Int. Cl.
*H04W 4/42*     (2018.01)
*H04W 84/10*    (2009.01)
(Continued)

(52) U.S. Cl.
CPC ............ *H04W 4/42* (2018.02); *H04W 36/14* (2013.01); *H04W 36/32* (2013.01); *H04W 84/005* (2013.01); *H04W 84/10* (2013.01)

(58) Field of Classification Search
None
See application file for complete search history.

(56) References Cited

U.S. PATENT DOCUMENTS

| 2008/0195265 A1 | 8/2008 | Searle et al. |
| 2014/0156135 A1 | 6/2014 | Maki et al. |

(Continued)

FOREIGN PATENT DOCUMENTS

| EP | 3523704 A | 8/2019 |
| JP | 2001063581 A1 | 3/2001 |

(Continued)

OTHER PUBLICATIONS

International search report dated Jun. 1, 2018 for corresponding Application No. PCT/US2018/018689.

(Continued)

*Primary Examiner* — Saba Tsegaye
(74) *Attorney, Agent, or Firm* — Christopher R. Carroll; The Small Patent Law Group LLC

(57) ABSTRACT

A vehicle communication system includes a mobile server unit configured to be operably deployed onboard a first vehicle of a vehicle system. The mobile server unit includes an antenna, a transceiver, and a controller. The controller is configured to control the transceiver to establish a wireless onboard private long term evolution (LTE) network with plural mobile client units that are located on other vehicles of the vehicle system, for wireless communications between the vehicles of the vehicle system, while the vehicle system is moving. The mobile server unit may be configured to establish the private LTE network in coordination with other mobile server units that are onboard other vehicles in the vehicle system, such that a selected one of the mobile server units is designated as a master server unit for overall control (Continued)

of the private LTE network, and the other mobile server units are designated as subordinates.

20 Claims, 6 Drawing Sheets

(51) Int. Cl.
*H04W 84/00* (2009.01)
*H04W 36/14* (2009.01)
*H04W 36/32* (2009.01)

(56) References Cited

U.S. PATENT DOCUMENTS

| | | | |
|---|---|---|---|
| 2014/0188307 A1* | 7/2014 | Cooper | B61C 17/12 |
| | | | 701/2 |
| 2014/0198715 A1 | 7/2014 | Zasowski | |
| 2016/0249233 A1 | 8/2016 | Murray et al. | |
| 2017/0272931 A1* | 9/2017 | Bottari | H04W 4/42 |
| 2018/0027465 A1* | 1/2018 | Karlsson | H04W 36/165 |
| | | | 370/331 |
| 2018/0316764 A1* | 11/2018 | Ferreira Gomes | H04W 28/02 |

FOREIGN PATENT DOCUMENTS

| | | |
|---|---|---|
| JP | 2003318813 A | 11/2003 |
| WO | 2015116159 A1 | 8/2015 |
| WO | 2016191711 A1 | 12/2016 |
| WO | 2017054880 A1 | 4/2017 |
| WO | 2018068048 A1 | 4/2018 |

OTHER PUBLICATIONS

Extended European Search Report dated Nov. 27, 2020 for corresponding European Application No. 187548862 (11 pages).
Examination Report dated Dec. 1, 2021 for corresponding Australian Application No. 2018220617. (3 Pages).

* cited by examiner

VEHICLE COMMUNICATION SYSTEM

CROSS-REFERENCE TO RELATED APPLICATIONS

This application claims priority to and is a national stage application under 35 U.S.C. § 371(c) of prior filed PCT application serial number PCT/US18/18689, filed 20 Feb. 2018, which claims priority to U.S. Provisional Application No. 62/460,862, filed 19 Feb. 2017. The entire disclosures of these applications are incorporated herein by reference.

BACKGROUND

Technical Field

Embodiments of the subject matter described herein relate to communication systems for vehicles.

Discussion of Art

A vehicle system may include plural vehicles that are mechanically and/or logically linked (directly or indirectly) to travel together in coordination. Such vehicle systems are known as vehicle 'consists.' For example, a rail vehicle consist (e.g., train) may include one or more locomotives that are capable of self-propulsion and plural railcars, which are incapable of self-propulsion, that are coupled to the locomotive(s) for travel along a track. As another example, a vehicle platoon may include plural on-road vehicles (e.g., semi-trailer tractors) that while not mechanically linked, are communicatively linked for travel together along a road. The lead vehicle may be operated by a human operator, whereas the other vehicles in the platoon are not; the other vehicles are instead controlled (at least in part) by the lead vehicle.

Some vehicle systems are outfitted with wireless devices or wired connections for communications between the vehicles of the vehicle system. Wired connections can be cost prohibitive, due to having to outfit each vehicle with cables and weatherized ports. Also, it is more time consuming to connect and disconnect such vehicles from one another. Wireless devices may require significant amounts of power to operate, and may not include acceptable communication security features. Also, such devices are typically special-purpose in nature, requiring the use of plural different types of wireless devices if different modes of communication are to be used.

It may be desirable to provide vehicle communication systems and methods that differ from existing systems and methods.

BRIEF DESCRIPTION

In an embodiment, a system (e.g., a vehicle communication system) includes a mobile server unit configured to be operably deployed onboard a first vehicle of a vehicle system or consist. The mobile server unit includes at least one antenna, at least one transceiver configured to transmit and receive signals over the at least one antenna, and at least one controller coupled to the transceiver. The controller is configured to control the transceiver to establish a wireless onboard private long term evolution (LTE) network with plural mobile client units that are located on other vehicles of the vehicle system, for wireless communications between the vehicles of the vehicle system, while the vehicle system is moving, e.g., along a route.

According to another aspect, the mobile server unit may be configured to establish the private LTE network in coordination with other mobile server units that are onboard other vehicles in the vehicle system, such that a selected one of the mobile server units is designated as a master server unit for overall control of the private LTE network, and the other mobile server units are designated as subordinates.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the invention relate to wireless communication systems for vehicle systems (also referred to herein as vehicle consists). The system includes a mobile server unit that is operably deployable on a vehicle, e.g., the mobile server unit is sized for being carried onboard the vehicle and has electrical power requirements that can be met by the vehicle's onboard power system during travel. The mobile server unit is an eNodeB' or other base station that includes hardware for direct wireless LTE communications with plural mobile client units. Thus, the mobile server unit includes one or more antennas, RF transceivers, and controllers. The mobile server unit is configured to establish a wireless onboard private LTE network with plural mobile client units that are located on other vehicles of the vehicle system. The private LTE network can be used to transmit data signals and/or control or command signals between the vehicles in the vehicle system. Examples include sensor-generated status or operational information, and commands for coordinated braking, distributed power control, and emergency or safety control.

In certain situations, two or more vehicles in a vehicle system or consist may each include a respective mobile server unit. This may be the case if all vehicles in a given transportation system are outfitted with mobile server units, or if certain classes or types of vehicles in a given transportation system are outfitted with mobile server units. For example, in a rail context, certain locomotives may be outfitted with mobile server units. If a train is assembled that includes plural server-equipped locomotives, the train would thereby include plural mobile server units. Thus, in an embodiment, each mobile server is configured to establish the wireless onboard private LTE network in coordination with any other mobile server units that are onboard the vehicle system and operational. As explained in more detail below, this may involve selecting a designated master mobile server unit, which is responsible for overall network operation, whereas the other mobile server units operate as clients, and/or as servers for sub-network portions of the overall onboard network.

As explained in further detail below, other aspects relate to admission and authorization of mobile client units to the network, changing and selection of network channels, server coordination, vehicle order determination, strategies for LTE communications in dynamic environments, and network/communication timing control.

Figure 1:
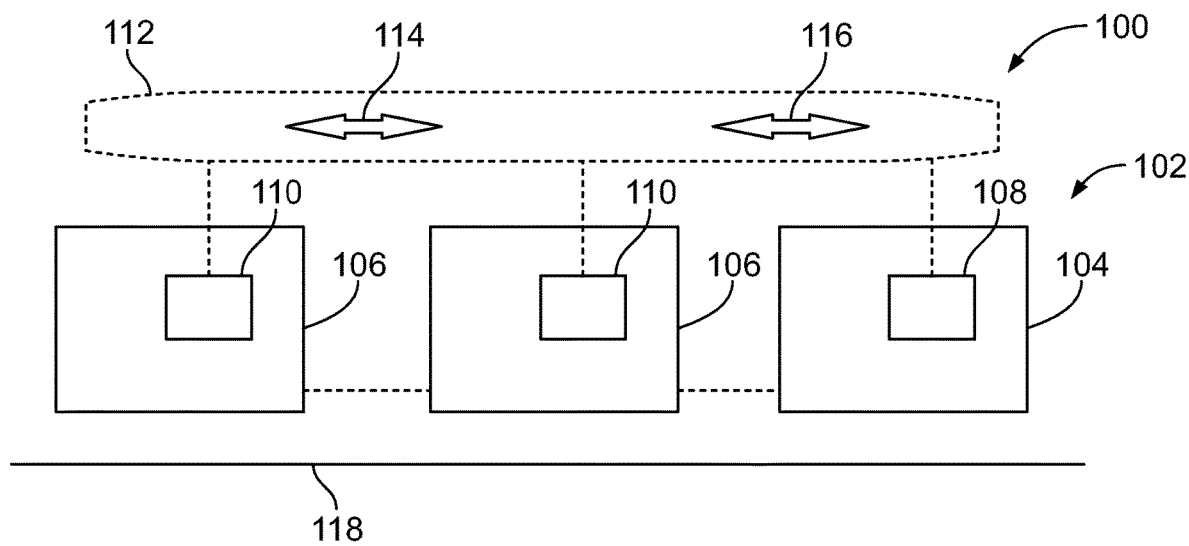
FIG. 1 is a schematic illustration of a vehicle communication system, according to an embodiment.

FIG. 1 shows an embodiment of vehicle communication system 100 for a vehicle system 102. The vehicle system includes a first vehicle 104 and plural (two or more) second vehicles 106, which are mechanically or logically coupled for travel in concert. A first mobile server unit 108 is operably deployed onboard the first vehicle 104. Plural mobile client units 110 are operably deployed on the second vehicles 106. For example, there may be one mobile client unit on each vehicle, plural mobile client units on a single vehicle, or some combination thereof. The mobile server unit 108 is configured to establish a wireless onboard private LTE network 112 with the plural mobile client units 110, for wireless communications of data signals 114 and/or control signals 116 between the vehicles of the vehicle system while the vehicle system is moving for travel, e.g., along a route 118.

'Private LTE network' refers to an ISM (industrial-scientific-medical) band of the radio-frequency spectrum that allows unlicensed use of LTE technology (e.g., LTE, 4G LTE, LTE Advanced, 5G LTE, etc.) for private, cellular network-like, wireless/RF communications. 'LTE' refers to the 'Long-Term Evolution' standard for high-speed wireless communications (e.g., for mobile phones and data terminals), based on GSM and UMTS technologies, and as developed/specified by the $3^{rd}$ Generation Partnership Project/3GPP. An 'onboard' network, as used herein, is one established by a mobile server unit (e.g., eNodeB, LTE base station, or the like) that is onboard a vehicle of a vehicle system, at least for communications between vehicles of the vehicle system. (This does not preclude the possibility of modes of operation where there are also communications between the onboard network and offboard networks.) An 'offboard' network is one that is established by equipment (e.g., an eNodeB or other base station) that is not on a given vehicle system, e.g., it may be on a different vehicle system, or fixed in place to the ground or otherwise not located on any vehicle. A 'public' network is any cellular communication network, typically operated by a mobile service provider, which is accessible to any member of the general public with suitably-configured mobile phones or other user equipment.

Figures 2, 3:
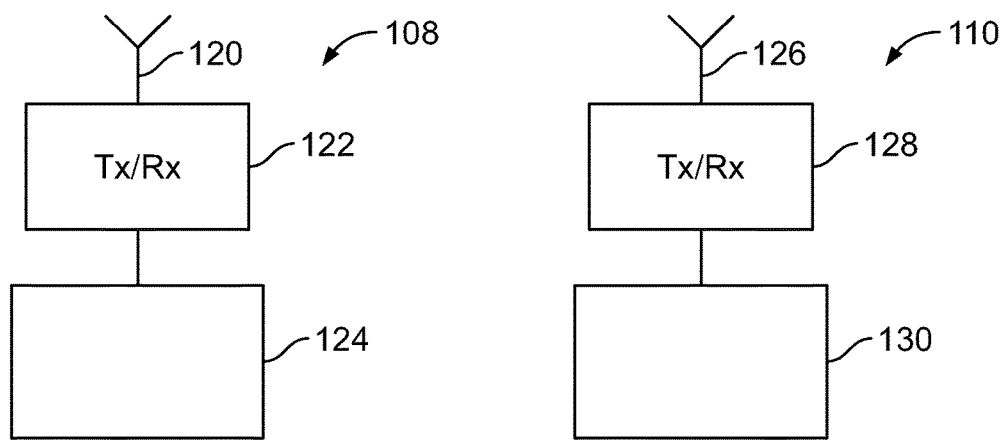
FIG. 2 is a schematic diagram of a mobile server unit, according to an embodiment.
FIG. 3 is a schematic diagram of a mobile client unit, according to an embodiment.

As mentioned above, the mobile server unit 108 (also referred to as simply a 'mobile server') is an eNodeB or other base station that includes hardware for direct wireless LTE communications with plural mobile client units. For example, the mobile server unit may be configured to communicate timing patterns so that mobile client units can communicate with it. Further, it may be the case that while operating as a server, the mobile server unit can only communicate with the mobile client units and not with another private LTE network or a public LTE network. FIG. 2 shows an embodiment of the mobile server unit 108 in more detail. The mobile server unit includes one or more antennas 120, one or more RF transceivers 122 coupled to the antenna(s), and one or more controllers 124 coupled to the transceiver(s). The antenna is a transducer that is configured to transmit and receive RF waves in all or a part of the LTE frequency bandwidth. The transceiver is configured to power the antenna for transmitting signals, and to receive and convert signals arriving at the antenna. (The term 'transceiver' includes transmitter-receivers, i.e., separate receivers and transmitters.) The controller includes one or more microprocessors and other circuitry, and controls the transceiver for sending and receiving information wirelessly, for LTE network control purposes and otherwise. The controller may also interface with other electronic devices located onboard the first vehicle and/or the vehicle system that use and/or generate information to be communicated. Unlike mobile client units, the mobile server unit coordinates LTE network communications with plural mobile client units, and carries out various network control functions such as radio resource management, resource block control, connection mobility control, radio admission control, dynamic resource allocation and scheduling, and so on.

Each mobile client unit 110 (also referred to as a 'mobile client') is a wireless LTE device that must communicate with a server (i.e., eNodeB or other base station) for its communications. If a given vehicle includes a single mobile client unit deployed thereon, then the term may also be used to refer to the vehicle itself. That is, as used herein, a vehicle outfitted with a wireless LTE device that must communicate with a server for LTE network communications may be referred to as a mobile client. With reference to FIG. 3, the mobile client unit 110 may include one or more antennas 126, one or more transceivers 128, and one or more controllers 130. The antenna is a transducer that is configured to transmit and receive RF waves in all or a part of the LTE frequency bandwidth. The transceiver is configured to power the antenna for transmitting signals, and to receive and convert signals arriving at the antenna. The controller includes one or more microprocessors and other circuitry, and controls the transceiver for wireless communications with a mobile server unit. The controller may also interface with other electronic devices located onboard the vehicle on which the mobile client unit is deployed, which use and/or generate information to be communicated. The controller may also interface with other electronic circuits that are part of the mobile client unit. For example, the mobile client unit may include a processor that controls a user interface portion of the mobile client unit, whereas the controller 130 is specific for controlling wireless communication aspects of the device. Alternatively, the controller may control both wireless communications and other functions.

Figure 4:
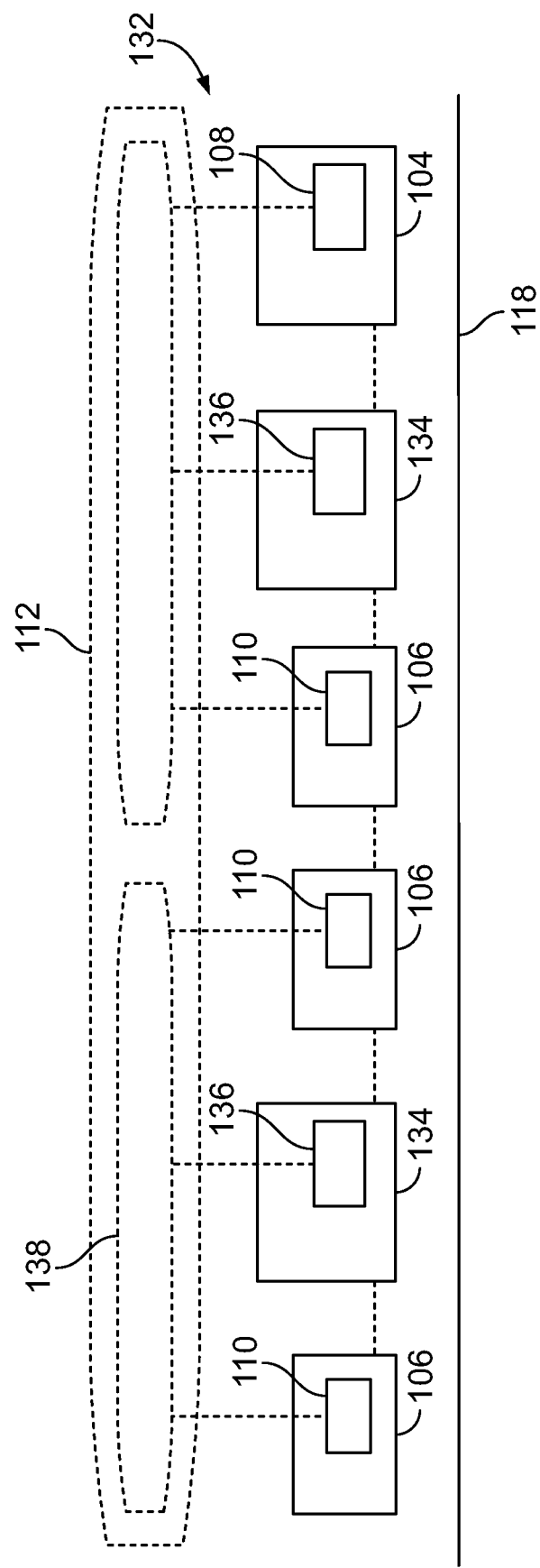
FIG. 4 is a schematic illustration of another embodiment of a vehicle communication system.

With reference to FIG. 4, a vehicle system 132, in addition to including the first vehicle 104 (outfitted with mobile server unit 108) and the plural second vehicles 106 (outfitted with the mobile client units 110), may also include other/third vehicles 134 onboard each of which is a respective second mobile server unit 136. For example, as mentioned above, locomotives in a rail transportation system may be outfitted with mobile server units, and there may be times when multiple such locomotives are included in a train. Thus, in an embodiment, the first mobile server unit 104 is configured to establish the onboard private LTE network 112 in coordination with other mobile server units 136 onboard other vehicles in the vehicle system. To put it another way, each mobile server unit 108, 136 that is part of the vehicle communication system 100 may be configured to coordinate with other mobile server units that are part of the same vehicle system, for establishment of the onboard private LTE network 112. Of course, if a given vehicle system includes only one mobile server unit, such as illustrated in FIG. 1, then there is no need for such intra-vehicle system coordination in that instance, keeping in mind that because vehicles may be assembled into different vehicle systems over time (e.g., for different trips or missions), the mobile server units will typically be provided with coordination functionality in case it is ever needed.

Figure 5:
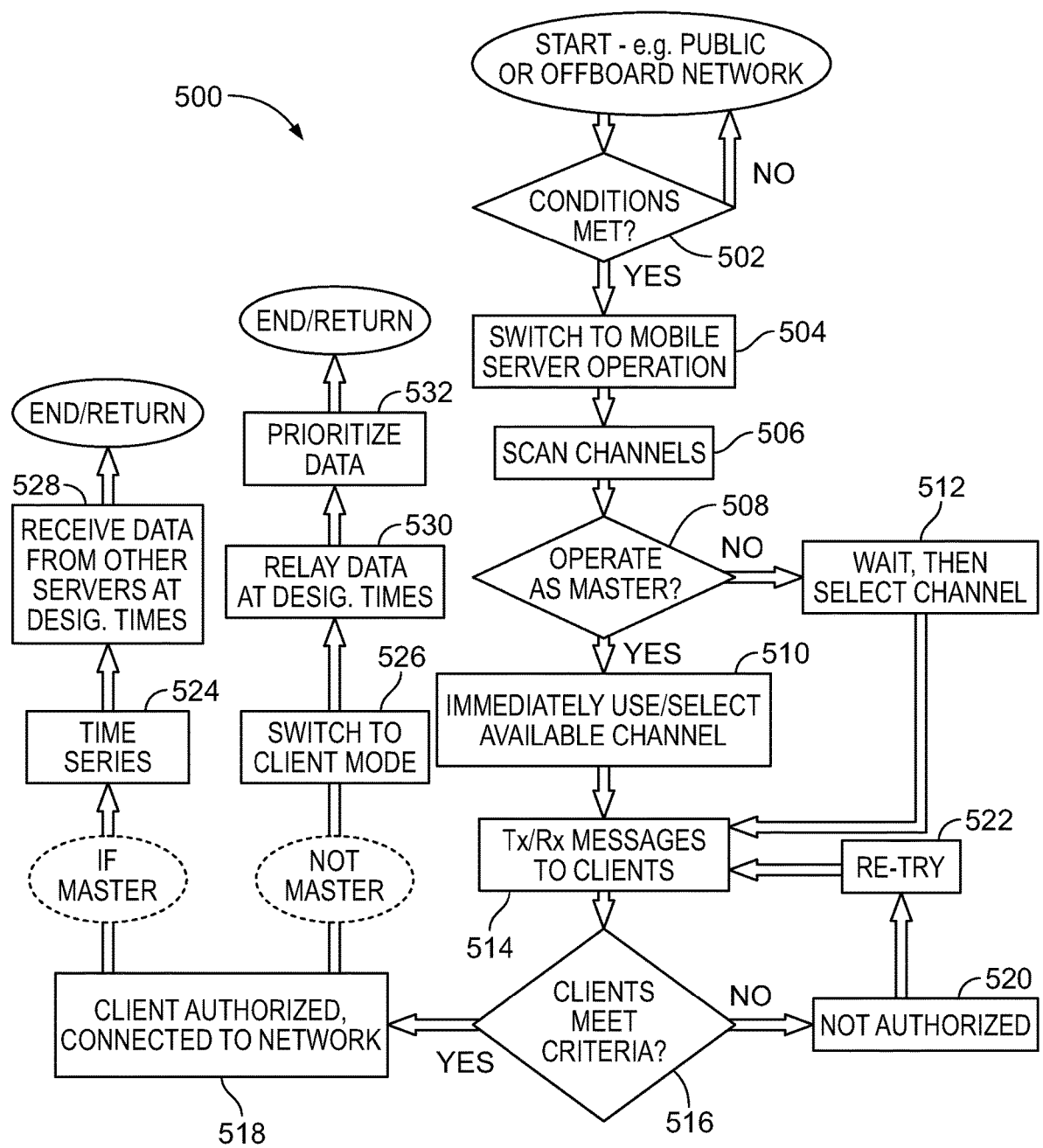
FIG. 5 is a flow diagram illustrating various aspects of mobile server operation.

FIG. 5 illustrates various operational aspects (methods of operation) 500 of the mobile server units 108, 136. As should be appreciated, in any given implementation or embodiment, fewer than all of the indicated aspects may be used, or additional aspects may be used, or the indicated aspects may be carried out in a different order or arrangement. The mobile server unit (deployed on a vehicle in a vehicle system) may be configured to determine if and when it switches to operate as a server. For example, the communication system may be set up so that under certain circumstances, the mobile server unit is connected to an offboard private LTE network or to a public LTE network, e.g., the mobile server unit is in an operational mode where it operates as a mobile client. Such circumstances may include, for example, the vehicle on which the mobile server unit is deployed being parked or in a yard, e.g., in the case of a rail vehicle, in a rail yard or switching yard, and/or the vehicle not being connected to any other vehicles as part of a vehicle system or consist. (A rail yard, for example, may have its own private LTE network that is used to communicate with vehicles in the yard.) Thus, the mobile server unit may be configured, as at 502, to determine if one or more designated conditions or criteria have been met for the mobile server unit to switch (e.g., from operating as a client) to operating as a server. The criteria may relate to the vehicle system being located far enough away from a rail yard or other location to reduce the likelihood of interference from other networks, and/or the vehicle (on which the mobile server unit is deployed) being part of a vehicle system. Thus, the criteria may include: the first vehicle or the vehicle system transitioning from a stationary state to a moving state; the first vehicle or the vehicle system moving continuously for a designated amount of time; the first vehicle or the vehicle system moving a designated distance; the first vehicle or the vehicle system leaving a first designated geographic region (i.e., geo-fencing); the first vehicle or the vehicle system entering a second designated region; the vehicle system being in a distributed power mode of operation; the first vehicle or the vehicle system traveling above a designated speed (e.g., the designated speed is a speed limit within an area where the server unit is not to operate as a server, and outside the area there is a higher speed limit); the first vehicle being connected to other vehicles to form the vehicle system; and/or the like.

If the conditions or criteria are met, at 504 the mobile server unit switches to operating as an LTE server. Since the private LTE network uses ISM channels that are present, the mobile server units may be configured to change to uncongested private LTE channels. Also, if there are multiple mobile server units in a vehicle system (e.g., each setting up its own private network for the vehicles around it), coordination is required. Thus, the mobile server unit is configured, at 506, to scan the available LTE channels to look for other LTE networks. This may be done, for example, for identifying other mobile server units that are active in the vehicle system. At 508, the mobile server unit determines if it should be the mobile server master for the vehicle system. The mobile server master is the selected or designated mobile server unit in a vehicle system that controls the overall LTE network and that serves as the master to other mobile server units in the vehicle system. The determination may be based on vehicle position or other vehicle criteria, e.g., whichever mobile server unit is in a lead vehicle of the vehicle system (front-most vehicle, or designated control lead) is the mobile server master. Thus, at 508 the mobile server unit may access a consist list that is stored in memory. The consist list is a list of the vehicles that make up the vehicle system, which may be uploaded to the vehicles when the vehicle system is assembled. If the consist list indicates that the vehicle in which the mobile server unit is deployed meets the criteria (e.g., lead vehicle), then the mobile server unit knows it should be the mobile server master, and proceeds accordingly.

If the mobile server unit is designated/selected as the mobile server master, at 510 it immediately uses/selects an available channel. Other mobile server units in the vehicle system will wait additional time, to allow for the mobile server master to become active (e.g., if the mobile server master is on the lead vehicle, for taking into consideration other mobile server units in front of them), and then also evaluate and choose a channel, as at 512. If the mobile server unit is not designated/selected as the mobile server master, it will wait and then choose a channel like the other non-designated/selected mobile server masters. Again, as should be appreciated, by waiting for designated criteria to be met (e.g., by waiting a configurable amount of time while moving) before the mobile server units activate as servers, this will allow sufficient time for the vehicle system to move away from congested areas (e.g., the private LTE network that is in a railyard) so that all available channels can be seen.

The mobile server units may be configured to evaluate the best channels to use based on a ratio of the strongest server RSSI subtracted by the noise floor, with weighting given to number of masters on a particular channel. Also, in the event that a mobile server unit is having issues due to presence of other servers (masters) in the area, an evaluation to move to a different channel can be made. This is done immediately.

Figure 6:
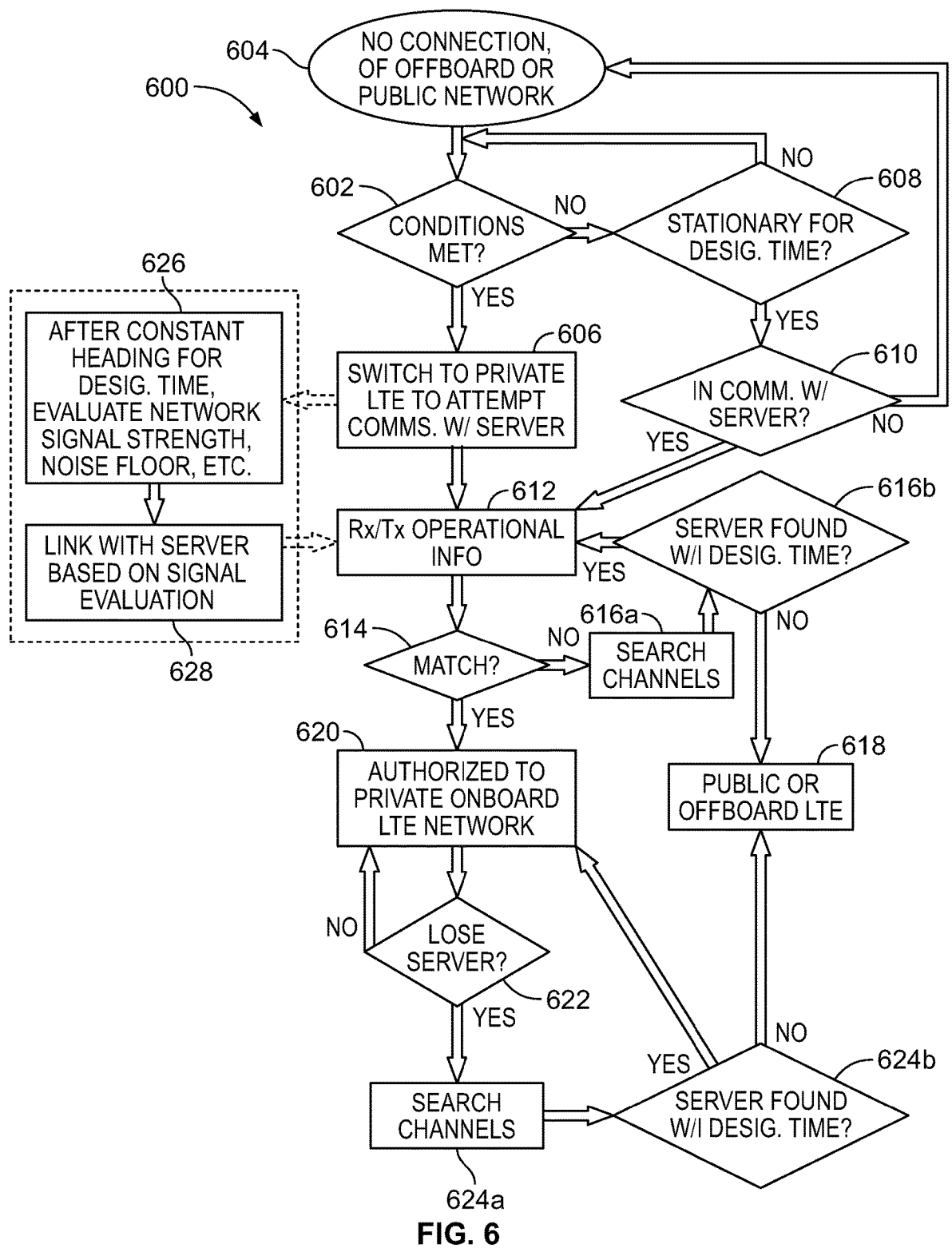
FIG. 6 is a flow diagram illustrating various aspects of mobile client operation.

Turning additionally to FIG. 6, which shows operational aspects (methods of operation) 600 of the mobile client units, the vehicle communication system is additionally configured for authorizing/controlling the mobile client units to link to the onboard private LTE network 112, e.g., the mobile client units are configured to determine or select which mobile server unit to connect to. For a given mobile client unit, the mobile client unit is configured, as at 602, to determine if one or more designated criteria or conditions are met for the mobile client unit to switch to an onboard private LTE network. The criteria may be the same as those discussed above in regards to 502. For example, since a mobile client unit that is moving can assume it is part of a vehicle system, the criteria may include a configurable amount of time continuously moving. If the criteria or conditions are met, the mobile client unit switches (e.g., from connection to a public LTE network as at 604) to an onboard private LTE network channel to attempt communications with a mobile server unit, as at 606. The mobile client unit may be further configured to determine (e.g., responsive to the conditions not being met at 602) if the mobile client unit has been stationary for a configurable amount of time, as at 608, which is indicative that the mobile client unit and/or its vehicle is possibly orphaned. The mobile client unit is configured, if it has been stationary for the amount of time, to revert to individual operation and connection with a public LTE channel (as at 604), unless active communications with a mobile server unit are taking place, as at 610. The mobile server units may be configured to communicate with the mobile client unit to indicate the vehicle on which the mobile server unit is deployed (e.g., a locomotive) is distributed power "unlinked," meaning the vehicle is moving to another consist. (In which case, if that is the only mobile server unit with which the mobile client unit is in communication, the mobile client unit may revert back to the public LTE network.)

To authorize mobile client units to the onboard private LTE network, the mobile server unit and the mobile client units may be configured to exchange information to determine if the mobile client units are part of the same vehicle system as the mobile server unit. This enables the mobile client units to be authorized 'on the fly,' without necessarily having been previously configured (such as before the vehicle system was assembled) to access to the onboard private LTE network. (This assumes it is desired for all mobile client units that are onboard a vehicle system to be able communicate over the onboard private LTE network of the vehicle system. If not, the mobile client units and/or mobile server units may be additionally configured for other/additional network connection and authorization functionality, such as all mobile client units within a given transportation company or other entity's fleet being provided with an onboard network access code that is exchanged with mobile server units for authorization.) Thus, the mobile client unit may be configured, as at 612, to transmit designated operational information of the vehicle in which the mobile client unit is deployed to the mobile server unit with which it is in communication. The designated operational information is received by the mobile server unit, as indicated at 514 in FIG. 5. The operational information is any designated information that is likely to be uniquely associated with operation of the vehicle system. For example, it may be a time period of how long the vehicle has been continuously moving since having been stopped (i.e., travel time), speed information (e.g., multiple speeds at different points in time), heading information (e.g., multiple headings at different points in time), brake pipe pressure, location information, and/or the like. The operational information may be adjusted, calibrated, or correlated to take into account differences between where the mobile client unit and the mobile server unit are located in the vehicle system. For example, in the case of a long train, a rear railcar may not start traveling at the same time as the lead locomotive. However, the mobile server unit can be configured to adjust received travel time information based on where the mobile client unit is located in the vehicle system (from a consist list or as otherwise determined), or the mobile server unit can be configured to look at the travel time relative to a given threshold (e.g., all vehicles in a vehicle system would have started moving within 'x' seconds of when the vehicle of the mobile server unit started moving), or the mobile server unit can be configured to look at multiple factors, or the mobile server unit and/or the mobile client units can be configured to calculate/determine the operational information only after (relative to when) a designated event or condition has occurred. For example, in the case of travel time, the travel time could be determined relative to when the vehicles in the vehicle system first started traveling at or above a designated speed, which is selected as a speed where it is likely that all vehicles in the vehicle system would be currently moving. (In the case of a train or other rail vehicle consist that commences movement after having been stopped, for example, it is unlikely that one vehicle in the consist would be traveling, say, at 30 kph while another vehicle in the consist is stopped.)

At 516, the mobile server unit is configured to determine if the operational information received from the mobile client unit meets one or more designated criteria. For example, the mobile server unit may determine if the received operational information (as received, or as correlated/adjusted) matches corresponding operational information of the mobile server unit or the vehicle in which the mobile server unit is deployed. For example, the mobile server unit may compare received travel time to its own travel time, to see if they match (e.g., exactly, or within a designated threshold). If the operational information meets the one or more designated criteria, the mobile client unit, as at 518, is connected/authorized to the onboard private LTE network of the mobile server unit. If not, as at 520, the mobile client unit is not connected/authorized to the network, and there may be a re-try period as at 522. For example, with reference back to FIG. 6, if the operational information meets the one or more designated criteria (e.g., a match) as at 614, the mobile client unit is connected/authorized to the network, as at 620. If not, the mobile client unit may be configured, as at 616a, 616b, to search available private LTE channels for finding a server unit or other server unit within a designated time period. If a server unit is found within the designated time period, the mobile client unit may transmit the designated operational information to that mobile server, etc. If not, the mobile server unit may switch to public LTE network access, as at 618.

As should be appreciated, the communication system 100 may be set up so that the mobile server units transmit designated operational information to the mobile client units for the mobile client units to assess the given criteria for network access, or for the mobile servers and mobile clients to exchange such information. Also, there may be additional security measures or requirements for authorizing mobile client units to the onboard network, such as network keys, the mobile client units having proper or designated communications security features, lists/databases of authorized devices, consist lists (e.g., whether the mobile client unit is onboard a vehicle that is on the consist list as being part of the vehicle system), and so on.

Further regarding channel selection, the mobile client unit may be configured, if it loses communications with its mobile server unit on a particular channel for a configurable amount of time, as at 622, to conduct a search on available private LTE network channels to find its old server unit on other channels. If the server unit is not found within a configurable (e.g., long) period of time, as at 624a, 624b, the mobile client unit switches to a public LTE network, as at 618. This could be done if the mobile server unit is malfunctioning or turned off—either way it is unavailable. On the other hand, if the server unit is found, it is reconnected, regardless of time or movement.

As mentioned, if there are multiple mobile server units on a vehicle system, the system is configured for coordination among the multiple server units. More specifically, if a mobile server unit is on vehicle that is remote from the vehicle of the mobile server master (e.g., on a distributed power remote locomotive), it may operate as a server for any mobile clients around it, i.e., it may establish its own private LTE network 138 (see FIG. 4) with nearby client units, which is in effect a sub-network of the overall vehicle system network. In the case of multiple such remote mobile server units, there may be plural private LTE networks/sub-networks established on the vehicle system at any given time. The mobile server units thereby communicate with their respective mobile clients and also with the mobile server master (e.g., lead locomotive). This may involve using GPS time to determine when the mobile server units (remote and master) should spend time syncing up. Also, this can be done by using the amount of time continuously moving, as well as a database or consist list so that the server units know which units are in the vehicle system.

For coordination, in an embodiment, the mobile server units that are part of a consist of other mobile server unit-equipped vehicles (e.g., a locomotive consist), that is, adjacent to or otherwise in close proximity to other mobile server unit-equipped vehicles, will use the lead mobile server unit (e.g., lead locomotive) as the mobile server master. As at 524 in FIG. 5, the mobile server master will set up a time series, where mobile servers that are not the master (e.g., remote or trailing locomotives in a network) will join the master mobile server at certain times to relay data (TDMA-like access). As at 526, trailing mobile server units (e.g., mobile server units that are on trailing locomotives, or otherwise not on lead vehicles of a vehicle consist) will have the option of not being a mobile server—as their close proximities to the mobile server master (e.g., lead locomotive) or lead remote does not necessarily help in network health. In this case, they will switch to a mode for operating as mobile clients. At specific time intervals, the mobile server master will coordinate messaging with the mobile clients that are typically mobile servers (the mobile servers will change type for this time interval). This is so information can be transmitted to the mobile server master from other server units (e.g., so that information can be brought forward to the front of the train), as at 528 and 530. In other words, for specific/designated time events, the mobile servers switch modes to temporarily operating as mobile clients, in order to relay information to the mobile server master (e.g., to the front of the train). Time intervals for communicating information in this situation (e.g., for bringing information to the front of the train) may involve critical data first for the safe operation of the vehicle system, and time slots will be set up to allow this prioritization of messaging, as at 532. Messages that are not acknowledged by the mobile server master will have the capability of being repeated, again more so based on their criticality. Also, the system may be configured for frequency coordination during these events, for example, based on the vehicle system maintaining a specific heading for a period of time (e.g., covering the length of the train based on speed) because directional antennas on the mobile server units will be most useful then (in a straight line).

Because the onboard private LTE network is established on a moving vehicle system, the communication system 100, in embodiments, is configured to address dynamic aspects of the communication environment, e.g., obstructions, multipath, and fading. In one aspect, for a train or other linear vehicle system, one or more of the antennas 120, 126, but more typically the antennas 126 on mobile client units, may be directional antennas. This would focus the RF signals from back to front (or vice versa in the case of mobile server units on a train), thereby facilitating a certain level of noise immunity. Further, understanding the heading of the vehicle system allows a mobile client unit to make the best decision when it comes to choosing a mobile server unit to participate with. Thus, as at 626 in FIG. 6, the mobile client unit may be configured, when searching for a private LTE network and having been at a constant heading for at least a certain/designated amount of time, to evaluate signal strength and noise floor to choose the correct or best mobile server unit, as at 628. Listening to the current mobile server should provide information on other mobile servers that are part of its network, including the mobile server master. In embodiments, a mobile client unit has a choice of communicating an urgent event (e.g., for the safe operation of the vehicle system) to not only its current mobile server, but change frequencies to send this status/information to another mobile server or more importantly the mobile server master (e.g., at the front of the train). Also, according to another aspect, a mobile client unit may be configured to exist in a state where it remains a member of a network, even if it has not seen its mobile server for a period of time. For example, it is expected that a mobile client unit may not see its mobile server continuously (e.g., due to tunnels, heavy foliage, or turns), and should queue status events or other communications until the mobile server returns.

The mobile server units, as mentioned, may also include directional antennas. Also, they may each include multiple respective antennas, e.g., one that is directional, and one that is omni-directional. In such a case, the mobile server units would be configured to choose which antenna to use based on whether the mobile server transitions to acting as a mobile client in the event of connection to a public LTE network. Alternatively or in addition, multiple directional antennas may be provided for spatial diversity for onboard communications. Further, the mobile server units may be configured to periodically provide information to the mobile clients about the makeup of the network, including the frequency channels of other mobile servers and the mobile master. This allows a mobile client unit to understand the network topology and make more informed decisions for switching mobile servers.

The communication system 100 may be further configured for antenna performance to be evaluated for longer time periods. Depending on the directional antenna type, for example, average RSSI values can be recorded by mobile clients that are in the network. Depending on the order of the mobile clients, if on the same heading for a period of time (straight line), the signal strength from antenna to mobile client should be very close to the same for a given distance. If the signal levels are appreciably different, an antenna issue can be detected. This would need to be done over a longer period of time due to elevation changes and antenna placement.

For private LTE network operation, it may be necessary or desirable to time synchronize the mobile client units and the mobile server unit(s). Time synchronization benefits are two-fold. First, a centralized analytics system is able to report events efficiently based on the time reported by the different sensors on the whole vehicle system. Second, TDMA access is guaranteed by properly configuring time slots to the different mobile clients. Also, a TDMA scheme can be extended to the different sensors in the vehicle system (e.g., used for monitoring vehicle operating conditions), for receiving sensor information on tight schedules. Time-sensitive networking specifies that networks with no more than seven hops are able to guarantee sufficient accuracy when distributing time. Even in cases involving distributed locomotives, each private LTE network may fail to distribute time accurately to a set of distant mobile clients. Thus, the communication system 100 may be further configured for distributing precise timing. For example, sync messages (and possibly follow ups) may be used to synchronize real time clocks. In one embodiment, time domains are partitioned between (sub) mobile servers. Sub mobile servers would be mobile clients augmented with an access to an accurate time source (such as GPS time) to avoid time discrepancies between domains. In another embodiment, a networking distribution time is defined where a mobile server would be a root mobile server distributing and communicating with sub mobile servers.

One aspect of establishing a private LTE network in a multi-vehicle system may involve the actual ordering of the vehicles. As such, with reference to FIG. 7, the communication system may be configured to carry out one or more methods 700 to determine the approximate placement of vehicles throughout a vehicle system. (Such methods are in fact applicable to any wireless network.) For example, in an embodiment, the mobile server master (e.g., lead locomotive or other lead vehicle) is configured, as at 702, to determine that a measurable event is taking place, including a change in speed (speed delta over a given time/rate), change in heading after going in one direction for a length of time calculated to be as long as the vehicle system (heading delta over a given time/rate), brake pipe pressure change event (BPP over time/rate), or the like. When this event occurs, the mobile server master transmits a message to the network indicating the occurrence of the event and the time when the event occurred, as at 704. This message includes the actual real calendar time when the event occurred (for instance, "At 3:59:21 pm a change in direction from 10 degrees to 45 degrees was completed, and I have been at 45 degree heading for 10 seconds"). The mobile server master then listens for mobile clients in the network to also have this event occur, as at 706. This event also applies to mobile server units (e.g., locomotives) that are not the mobile server master (e.g., not on the lead locomotive in the consist). The events, as they occur, on a trailing or remote vehicle (equipped with a server unit) will act just like the mobile client unit entries in this situation. This can be done to understand or verify vehicle order, as at 708. Specifically, if an event occurs at the lead vehicle at a given time, the next vehicle where the event next occurs should be closest to the lead vehicle, the next vehicle where the event next occurs should be next in order, and so on. Also, the "event seen" messages can be used to understand if a mobile client-equipped vehicle (e.g., railcar) is closer to another mobile server-equipped vehicle (e.g., locomotive) as opposed to the network that it is participating in. A trailing or remote mobile-server equipped vehicle can also announce this event cycle from the lead for the members of its network, acting as a relay node for the message.

Figure 7:
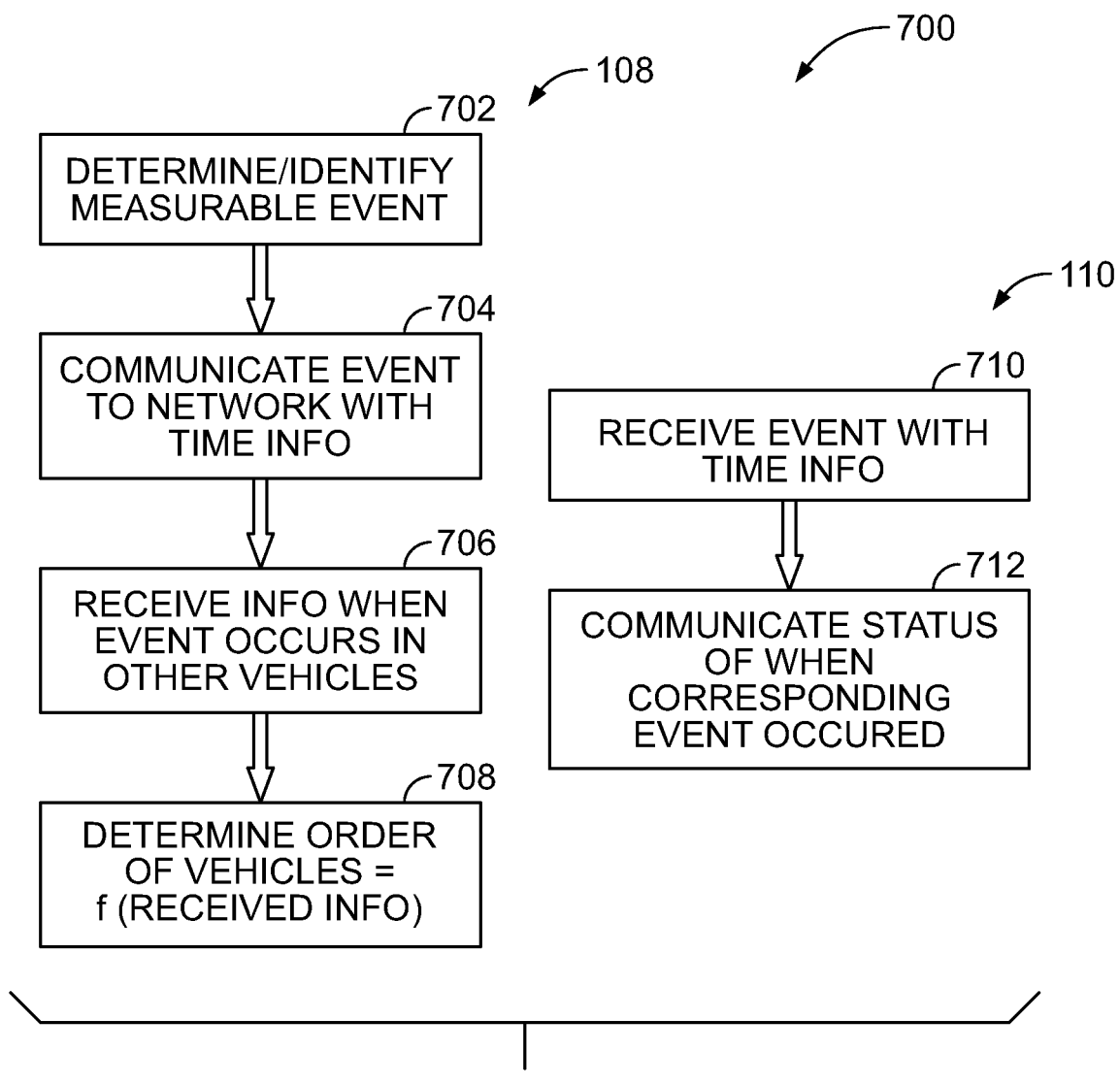
FIG. 7 includes flow diagrams of a method for determining vehicle order in a vehicle system, according to an embodiment.

Further with reference to FIG. 7, the mobile client units are configured, as at 710, to listen for the ordering start messages to occur. Whether it is change in speed, change in heading, change in brake pipe pressure, or otherwise, when these events occur the mobile client unit will announce its status, as at 712. The status on a vehicle (on which the mobile client is deployed) will always be announced—decision making for whether it is correct or not will be made at the server level. Announce messages help mobile servers and mobile clients to determine/locate the master clock (likely to be a mobile master server), and help (sub) server nodes act as a slave where they receive the time from the master clock, and become a master clock for the mobile clients connected to it. A mobile client can also use the announce message to take the announce time, and based on when the event is seen, have an approximation of how far back in the vehicle system the mobile client is.

Once the mobile client has announced its status, the mobile server can also send a message back to the mobile client to verify it is a member of its vehicle system, or possibly also let the mobile client know that it is no longer a member of the network (e.g., because it did not respond to announce message for heading change). The mobile client has the option of telling the mobile server that it never received the announce message for ordering, so it has an option of staying in the network.

Alternatively or additionally, determinations of vehicle ordering or positioning in an LTE network-equipped vehicle system may be based on using Observed Time Difference of Arrival (OTDOA) and/or enhanced Cell ID (eCID). An overview of these LTE features is available in Mike Thorpe, M. Kottkamp, A. Rössler, J. Schutz, "LTE Location Based Services Technology Introduction—White paper", Rohde & Schwarz (April 2013), available at http://www.rohde-schwarz-wireless.com/documents/LTELBSWhitePaper_RohdeSchwarz.pdf, which is hereby incorporated by reference herein.

Figure 8:
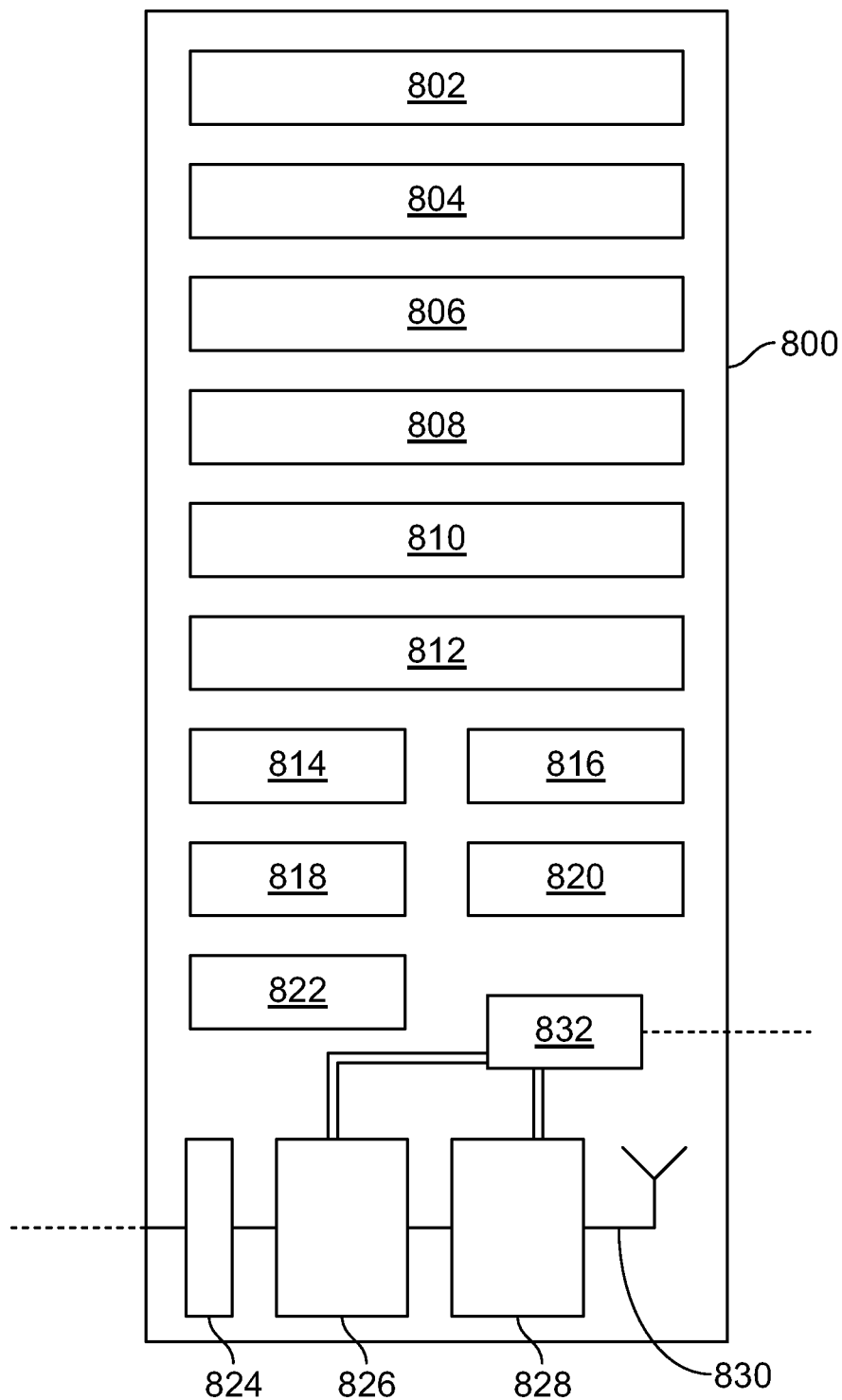
FIG. 8 is a schematic diagram of an embodiment of a mobile server unit.

FIG. 8 shows a functional and schematic diagram of an example of a mobile server unit 800, e.g., as might be applicable for use as the units 108, 136, etc. The mobile server unit includes a chassis, cabinet, or other housing (not shown), which houses one or more controllers (e.g., microprocessors and related circuitry) 826, one or more RF amplifier and transceiver circuits 828, one or more antenna ports 830 for attaching one or more antennas or antenna leads to the RF amplifier and transceiver circuits, a power supply 832 (connected to an onboard power source, such as an electrical bus, not shown), and an input/output (I/O) block 824 connected to the controllers. For example, the I/O block may include various ports and related circuitry to electrically connect the unit to an onboard Ethernet network, an onboard vehicle controller, another onboard control or communications bus, etc. The one or more controllers are configured (by way of programming stored in memory, and/or by way of circuit configuration) to implement various control aspects for carrying out LTE communications as set forth herein. These may include, for example, inter-cell radio resource management 802 (functions related to the radio bearers, such as radio bearer control, radio admission control, radio mobility control, scheduling and dynamic allocation of resources in both uplink and downlink), resource block control 804 (controlling transmission based on resource blocks, each of which consists of a certain sub-carrier bandwidth for a designated time slot/period), connection mobility control 806 (i.e., in-cell radio resource management), radio admission control 808, measurement and measurement reporting configuration for mobility and scheduling 810, and dynamic resource allocation (scheduler) 812. Other functions/functional layers may include radio resource control 814, packet data convergence control 816, radio link control 818, medium access control 820, and a physical layer 822 (which may include the aforementioned I/O block, controllers/amplifiers, etc., and/or antenna and transmission control such as OFDM.)

As noted above, a vehicle system or vehicle consist is a group of two or more vehicles that are mechanically or logically coupled to travel together in coordination. The vehicles in a vehicle consist can be propulsion-generating units (e.g., vehicles capable of generating propulsive force, which also are referred to as propulsion-generating units, powered units, or powered vehicles) that may be in succession and connected together so as to provide motoring and/or braking capability for the vehicle consist. The propulsion-generating units may be connected together with no other vehicles or cars between the propulsion-generating units. One example of a vehicle consist is a locomotive consist that includes locomotives as the propulsion-generating units. Other vehicles may be used instead of or in addition to locomotives to form the vehicle consist. A vehicle consist can also include non-propulsion generating units, such as where two or more propulsion-generating units are connected with each other by a non-propulsion-generating unit, such as a railcar or other vehicle that cannot generate propulsive force to propel the vehicle consist. A larger vehicle consist, such as a train, can have sub-consists. Specifically, there can be a lead consist (of propulsion-generating units), and one or more remote consists (of propulsion-generating units), such as midway in a line of cars and/or at the end of the train.

In cases where the vehicle system includes multiple powered vehicles, the vehicle system may coordinate operations of the powered vehicles to move the vehicle system. For example, a rail vehicle system may include a powered unit consist that has one or more powered units coupled to one or more non-powered rail cars. Vehicles in a consist may include a designated lead powered unit and one or more remote powered units and/or trail powered units. (The lead powered unit may be at the front, or may be located elsewhere but designated as the lead from a control perspective. Remote powered units are those that are spaced apart from the lead powered unit by one or more non-powered vehicles. Trail powered units are those that are in the same powered unit consist as the lead powered unit, and thereby not spaced apart from the lead powered unit by one or more non-powered rail vehicles, but that are subordinate to control by the lead powered unit.) The lead vehicle may control operation of one or more remote vehicles. More specifically, the lead vehicle (e.g., a lead locomotive) may coordinate tractive and braking operations of the different powered units (e.g., remote or trail locomotives) to control movement of the rail vehicle consist (e.g., a train). In some cases, a single train may include a plurality of such locomotive consists. The locomotive consists may communicate with one another to coordinate tractive and braking operations of the train.

The vehicle consist may have a lead propulsion-generating unit and a trail or remote propulsion-generating unit. The terms "lead," "trail," and "remote" are used to indicate which of the propulsion-generating units control operations of other propulsion-generating units, and which propulsion-generating units are controlled by other propulsion-generating units, regardless of locations within the vehicle consist. For example, a lead propulsion-generating unit can control the operations of the trail or remote propulsion-generating units, even though the lead propulsion-generating unit may or may not be disposed at a front or leading end of the vehicle consist along a direction of travel. A vehicle consist can be configured for distributed power operation, wherein throttle and braking commands are relayed from the lead propulsion-generating unit to the remote propulsion-generating units by a radio link or physical cable. Toward this end, the term vehicle consist should be not be considered a limiting factor when discussing multiple propulsion-generating units within the same vehicle consist.

The various components and modules described herein may be implemented as part of one or more computers, computing systems, or processors. The computer, computing system, or processor may include a microprocessor. The microprocessor may be connected to a communication bus. The computer or processor may also include a memory. The memory may include random access memory (RAM) and read only memory (ROM). The computer or processor further may include a storage system or device, which may be a hard disk drive or a removable storage drive such as a floppy or other removable disk drive, optical disk drive, and the like. The storage system may also be other similar means for loading computer programs or other instructions into the computer or processor. The instructions may be stored on a tangible and/or non-transitory computer readable storage medium coupled to one or more servers.

As used herein, the term "computer" or "computing system" or "controller" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer" or "computing system" or "controller."

The set of instructions may include various commands that instruct the computer or processor as a processing machine to perform specific operations such as the methods and processes described herein. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings without departing from its scope. While the dimensions and types of materials described herein are intended to define the parameters, they are by no means limiting and are exemplary embodiments. Many other embodiments will be apparent to one of ordinary skill in the art upon reviewing the above description. As used herein, the terms "including," "includes," and "in which" are used as the plain-English equivalents of the respective terms "comprising," "comprises," and "wherein." Moreover, the terms "first," "second," and "third," etc. are used merely as labels, and are not intended to impose numerical requirements on their objects.

This written description uses examples to disclose several embodiments, and also to enable any person skilled in the art to practice the embodiments, including making and using any devices or systems and performing any incorporated methods. The patentable scope may include other examples that occur to one of ordinary skill in the art. Such other examples are intended to be within the scope of the invention if they have structural elements that do not differ from the literal language herein, or if they include equivalent structural elements with insubstantial differences from the literal languages used herein.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods for communicating data in a vehicle system or consist, without departing from the spirit and scope of the embodiments described herein, it is intended that all of the subject matter of the above description or shown in the accompanying drawings shall be interpreted merely as examples illustrating the inventive subject matter herein and shall not be construed as limiting.

What is claimed is:

1. A system comprising:
a first mobile server unit configured to be operably deployed onboard a first vehicle of a vehicle system, the mobile server unit comprising at least one antenna, at least one transceiver configured to transmit and receive signals over the at least one antenna, and at least one controller coupled to the at least one transceiver,
wherein the at least one controller is configured to control the at least one transceiver to disconnect from a wireless, off-board public long term evolution (LTE) network with which the at least one transceiver was connected and to establish a wireless onboard private LTE network with plural mobile client units that are located on one or more of plural second vehicles of the vehicle system, for wireless communication of the signals between the first vehicle and the one or more of the plural second vehicles, while the vehicle system is moving, the at least one controller configured to control the at least one transceiver to disconnect from the public LTE network and to establish the private LTE network responsive to one or more designated criteria related to movement of the vehicle system being met.

2. The system of claim 1, wherein the at least one controller is configured to control the at least one transceiver to establish the private LTE network in coordination with one or more second mobile server units onboard one or more of the plural second vehicles, such that a selected one of the first mobile server unit or one of the one or more second mobile server units is designated as a master server unit for overall control of the private LTE network and another of the first mobile server unit or the one or more second mobile server units are designated as subordinate mobile server units.

3. The system of claim 2, wherein the master server unit is designated based on the one or more designated criteria.

4. The system of claim 3, wherein the one or more designated criteria comprise the mobile server unit that is designated as the master server unit being onboard a lead vehicle of the vehicle system, wherein the lead vehicle is at least one of a designated control lead for distributed power operations of the vehicle system or a front-most vehicle of the vehicle system.

5. The system of claim 1, wherein the one or more designated criteria comprise at least one of the first vehicle or the vehicle system transitioning from a stationary state to a moving state, the first vehicle or the vehicle system moving a designated amount of time, the first vehicle or the vehicle system moving a designated distance, the first vehicle or the vehicle system leaving a first designated geographic region, the first vehicle or the vehicle system entering a second designated geographic region, the vehicle system being in a distributed power mode of operation, or the first vehicle or the vehicle system traveling above a designated speed.

6. The system of claim 5, wherein the first mobile server unit is configured to switch from a connection to the public LTE network or from a connection to an offboard wireless private LTE network, to establishing the onboard private LTE network responsive to the first vehicle or the vehicle system meeting the one or more designated criteria.

7. The system of claim 1, wherein the first mobile server unit is configured to at least one of transmit first operational information of the vehicle system to the mobile client units or receive second operational information of the vehicle system from the mobile client units, and to authorize connection of the mobile client units to the onboard private LTE network based at least in part on one or more of the first operational information or the second operational information.

8. The system of claim 7, wherein:
the second operational information includes identifying information of the second vehicles, and the first mobile server unit is configured to authorize connection of the mobile client units to the onboard private LTE network if the identifying information matches a consist list of the vehicle system; or
at least one of the first operational information or the second operational information includes at least one of travel time, speed information, heading information, or location information of one or more of the first vehicle or the second vehicles, and the first mobile server unit is configured to authorize connection of the mobile client units to the onboard private LTE network if the travel time, speed information, heading information, or location information associated with the second vehicles matches the travel time, speed information, heading information, or location information of the first vehicle.

9. The system of claim 1, wherein the first mobile server unit is configured to:
determine if the first vehicle or the first mobile server unit satisfies one or more designated criteria relating to selection of a master server unit for the vehicle system, wherein the master server unit is designated for overall control of the private LTE network and any mobile server units in the vehicle system other than the master server unit are subordinate to the master server unit;
responsive to the first vehicle or the first mobile server unit satisfying the one or more designated criteria, assume operation as the master server unit and immediately select an available channel of the private LTE network; and
responsive to the first vehicle or the first mobile server unit failing to satisfy the one or more designated criteria, wait a designated non-zero time period and then select an available channel of the private LTE network.

10. The system of claim 1, wherein the first mobile server unit is configured to:
determine if the first vehicle or the first mobile server unit satisfies one or more designated criteria relating to selection of a master server unit for the vehicle system, wherein the master server unit is designated for overall control of the private LTE network and other mobile server units onboard other vehicles in the vehicle system are subordinate to the master server unit;
responsive to the first vehicle or the first mobile server unit satisfying the one or more designated criteria, assume operation as the master server unit and, during designated time periods, receive data from the other mobile server units; and responsive to the first vehicle or the first mobile server unit failing to satisfy the one or more designated criteria, relay data to the master server unit during the designated time periods, wherein the data relates to one or more of operation of the first vehicle, operation of the first mobile server, or to operation of the one or more of the plural second vehicles of the vehicle system having the mobile client units in communication with the first mobile server unit.

11. The system of claim 1, wherein:

the signals comprise one or more of data signals or control signals;

the system further comprises one or more sensors onboard the first vehicle and configured to generate sensor signals indicative of operational conditions of the first vehicle; and the first mobile server unit is configured to at least one of: communicate the sensor signals as the data signals to the plural second vehicles over the private LTE network; or communicate the control signals to the plural second vehicles over the private LTE network, the control signals configured to control at least one of throttle settings or braking settings of the plural second vehicles while the vehicle system is moving.

12. A system comprising:

a first mobile client unit configured to be operably deployed onboard a first vehicle of a vehicle system, the mobile client unit comprising at least one antenna, at least one transceiver configured to transmit and receive signals over the at least one antenna, and at least one controller coupled to the at least one transceiver, wherein the at least one controller is configured to control the at least one transceiver, while the vehicle system is moving, to disconnect from a wireless off-board public long term evolution (LTE) network and to link with a first mobile server unit on a second vehicle of the vehicle system through a wireless onboard private LTE network that is established by the first mobile server unit responsive to movement of the vehicle system meeting one or more designated criteria, for wireless communication of the signals between the first vehicle and the second vehicle.

13. The system of claim 12, wherein the first mobile client unit is configured, responsive to one or more designated criteria being met, to switch to a selected channel of the onboard private LTE network for communication with the first mobile server unit.

14. The system of claim 13, wherein the one or more designated criteria include one or more of transition of the first vehicle from a stationary state to a moving state, movement of the first vehicle for a first designated time period, movement of the first vehicle above a designated speed, the first vehicle leaving a first designated geographic region, the first vehicle entering a second designated geographic region, or the first vehicle traveling on a constant heading for a second designated time period.

15. The system of claim 13, wherein the first mobile client unit is configured to select the channel based on a signal evaluation that is conducted by the first mobile client unit responsive to the first vehicle having traveled on a constant heading for a designated time period.

16. The system of claim 15, wherein the first mobile client unit is configured to select the channel from among plural available channels of the onboard private LTE network that are associated with the first mobile server unit and one or more second mobile server units that are respectively onboard one or more third vehicles of the vehicle system.

17. The system of claim 12, wherein the first mobile client unit is configured to one or more of transmit first operational information of the first vehicle to the first mobile server unit or receive second operational information of the second vehicle or the vehicle system from the first mobile server unit, and wherein the first mobile client unit is authorized for access to the onboard private LTE network if the first operational information corresponds to the second operational information.

18. The system of claim 17, wherein the first mobile client unit is configured transmit the first operational information or receive the second operational information responsive to or subsequent to one or more designated criteria being met, the one or more designated criteria including one or more of transition of the first vehicle from a stationary state to a moving state, movement of the first vehicle for a first designated time period, movement of the first vehicle above a designated speed, the first vehicle leaving a first designated geographic region, the first vehicle entering a second designated geographic region, or the first vehicle traveling on a constant heading for a second designated time period.

19. The system of claim 12, wherein the first mobile client unit is configured, responsive to losing communications with the first mobile server unit, to search available channels of the onboard private LTE network for at least a designated time period, and to switch to an offboard private LTE network or a public LTE network if the first mobile client unit is unable to connect to the first mobile server unit or any other mobile server units onboard the vehicle system.

20. A system comprising:

a vehicle system including plural vehicles configured to travel in coordination with one another;

first and second mobile server units operably deployed on first and second vehicles of the vehicle system, respectively, wherein each of the first and second mobile server units includes at least one respective antenna, at least one respective transceiver configured to transmit and receive signals over the at least one antenna, and at least one respective controller coupled to the at least one transceiver; and plural mobile client units operably deployed onboard plural third vehicles of the vehicle system, respectively, each mobile client unit comprising at least one respective antenna, at least one respective transceiver configured to transmit and receive the signals over the at least one antenna, and at least one respective controller coupled to the at least one transceiver, wherein the first and second mobile server units are configured to disconnect from a wireless off-board public long term evolution (LTE) network and establish a wireless onboard private LTE network onboard the vehicle system with the plural mobile client units responsive to movement of the vehicle system meeting one or more designated criteria, for wireless communication of the signals between the first, second, and third vehicles, while the vehicle system is moving.

* * * * *